(12) United States Patent
Choi et al.

(10) Patent No.: US 8,304,034 B2
(45) Date of Patent: Nov. 6, 2012

(54) ONE-SOLUTION TYPE THERMOSETTING COMPOSITION FOR PROTECTIVE FILM OF COLOR FILTER, AND COLOR FILTER USING SAME

(75) Inventors: Hyun-Moo Choi, Gunpo (KR); O-Bum Kwon, Seoul (KR); Sun-Yul Lee, Suwon (KR)

(73) Assignee: Cheil Industries Inc., Gumi-si (KR)

( * ) Notice: Subject to any disclaimer, the term of this patent is extended or adjusted under 35 U.S.C. 154(b) by 241 days.

(21) Appl. No.: 12/669,522

(22) PCT Filed: Dec. 31, 2007

(86) PCT No.: PCT/KR2007/007036
§ 371 (c)(1),
(2), (4) Date: Jan. 18, 2010

(87) PCT Pub. No.: WO2009/011481
PCT Pub. Date: Jan. 22, 2009

(65) Prior Publication Data
US 2010/0168278 A1   Jul. 1, 2010

(30) Foreign Application Priority Data
Jul. 18, 2007   (KR) .................... 10-2007-0071946

(51) Int. Cl.
*F21V 9/00* (2006.01)
*B32B 27/38* (2006.01)
*C09K 19/52* (2006.01)

(52) U.S. Cl. ........... 428/1.1; 428/413; 525/95; 525/107; 525/117; 525/119; 525/523; 525/524; 525/530; 525/533

(58) Field of Classification Search .................... None
See application file for complete search history.

(56) References Cited

U.S. PATENT DOCUMENTS

| 7,641,946 | B2 * | 1/2010 | Kanamaru et al. ........... 428/1.54 |
| 7,722,932 | B2 * | 5/2010 | Kwon et al. .................. 427/386 |
| 2009/0206328 | A1 | 8/2009 | Matsukawa et al. | |

FOREIGN PATENT DOCUMENTS

| CN | 1414048 | 4/2003 |
| CN | 1258573 | 6/2006 |
| JP | 62-163016 | 7/1987 |
| JP | 63-131103 | 6/1988 |
| JP | 01-134306 | 5/1989 |
| JP | 06250390 A * | 9/1994 |
| JP | 08-050289 | 2/1996 |
| JP | 08-201617 | 8/1996 |
| JP | 2001-091732 | 4/2001 |
| JP | 2001164072 A * | 6/2001 |
| JP | 2003-128957 | 5/2003 |
| JP | 2007-065612 | 3/2007 |
| KR | 10-0631001 A | 7/2001 |
| TW | 200712161 | 4/2007 |
| WO | 2006/073115 A1 | 7/2006 |
| WO | 2009/011481 A1 | 1/2009 |

OTHER PUBLICATIONS

Machine translation of JP 06250390 A, provided by the JPO website (no date).*
Machine translation of JP 2001164072 A, provided by the JPO website (no date).*
Machine translation of KR 10-0631001 B1, provided by the KIPO website (no date).*
Machine translation of JP 2003128957 A, provided by the JPO website (no date).*
Machine translation of JP 2007065612 A, provided by the JPO website (no date).*
Derwent abstract of CN 1414048 A (2003).*
Derwent abstract of TW 200712161 A (2007).*
International Search Report and Written Opinion in counterpart International Application Serial No. PCT/KR2007/007036, mailed on Apr. 18, 2008.

* cited by examiner

*Primary Examiner* — Michael J Feely
(74) *Attorney, Agent, or Firm* — Summa, Additon & Ashe, P.A.

(57) ABSTRACT

The present invention relates to one-solution type thermosetting resin composition for a protective film of a color filter, and a color filter including the same. The one-solution type thermosetting resin composition includes a copolymer (A) including (meth)acrylate with an epoxy cyclic structure at the side chain, (meth)acrylate with a hydroxyl terminal, acid anhydride, and maleimide with a substituent; an epoxy resin (B); a base-generating agent (C); and an organic solvent (D). When a protective film of a color filter is prepared by using the one-solution type thermosetting resin composition according to the present invention, it has excellent storage stability as well as excellent flatness, close-contacting property, transmission properties, heat resistance, and chemical resistance.

11 Claims, No Drawings

ONE-SOLUTION TYPE THERMOSETTING COMPOSITION FOR PROTECTIVE FILM OF COLOR FILTER, AND COLOR FILTER USING SAME

CROSS-REFERENCE TO RELATED APPLICATIONS

This application is a national stage application under 35 USC Section 371 and claims priority to and the benefit of International Application No. PCT/KR2007/007036, filed Dec. 31, 2007, designating the U.S. and published as WO 2009/011481, and further claims priority to and the benefit of Korean Patent Application No. 10-2007-0071946 filed in the Korean Intellectual Property Office on Jul. 18, 2007, wherein the entire disclosure of each of the foregoing is incorporated herein by reference.

BACKGROUND OF THE INVENTION (a) Field of the Invention

The present invention relates to a one-solution type thermosetting resin composition for a protective film of a color filter, and a color filter fabricated using the same. More particularly, the present invention relates to a one-solution type thermosetting resin composition being capable of improving flatness, close-contacting property, transmission properties, heat resistance, chemical resistance, and storage stability of a protective film of a color filter, and a color filter fabricated using the same.

(b) Description of the Related Art

In general, a liquid crystal display (LCD) and an image sensor require a color filter including a protective film on its surface for the purpose of flatness improvement and protection. This surface protective film should have sufficient heat resistance and chemical resistance to endure a process for developing optical transparency and forming a transparent conducting film. In addition, a one-solution type thermosetting resin composition should be capable of being stored for an extended period of time at a normal temperature, and have sufficient storage stability at a high temperature in order to diminish a waiting period to reach room temperature before use.

Materials for a protective film of a color filter and a method of forming the same are conventionally well-known. For example, Japanese Patent Laid-open Pyong 1-134306 discloses a protective film of a color filter that was prepared by using glycidylmethacrylate as a main component, Japanese Patent Laid-open Soh 62-163016 discloses a protective film of a color filter including polyimide as a main component, and Japanese Patent Laid-open Soh 63-131103 discloses a protective film of a color filter including a mixture of a melamine resin and an epoxy resin as a main component.

In addition, many other examples of a composition for a protective film of a color filter have been disclosed, which were prepared to have high reliability such as through adhesion strength, heat resistance, chemical resistance, water resistance, and the like, by using an epoxy resin. For example, Japanese Patent Laid-open Pyong 08-050289 discloses a curable resin composition prepared by using a phenol-based curing agent with a glycidylmethacrylate polymer. Further, Japanese Patent Laid-open Pyong 08-201617 discloses a resin composition for a transparent film including an epoxy resin, a curing agent, and an organic solvent. The curing agent includes a reactant of a styrene maleic anhydride copolymer and an amine series.

In general, since an epoxy resin quickly reacts with a curing agent, it is commonly prepared as a two-component thermosetting resin that is used by mixing a main material and a curing agent, rather than as a one-solution type thermosetting resin. Since the two-component thermosetting resin is difficult to handle, there are difficulties in mass production of the same.

However, no marketable one-solution type epoxy having long-term storage stability at room and high temperatures as well as resin transparency, heat resistance, acidic resistance, and alkali resistance has been produced. Japanese Patent Laid-open No. 2001-091732 discloses technology for improving storage stability by protecting a multi-functional carbonic acid compound with vinylether and the like, but it has problems of a complex manufacturing process and a low yield of the protection-treated epoxy resin.

SUMMARY OF THE INVENTION

An exemplary embodiment of the present invention provides a one-solution type thermosetting resin composition for a protective film of a color filter having excellent adhesion strength, flatness, transparency, heat resistance, acidic resistance, and alkali resistance, and long-term storage stability at room and high temperatures.

Another embodiment of the present invention provides a color filter including a protective film prepared by using the one-solution type thermosetting resin composition for a protective film of a color filter, thereby providing excellent adhesion strength, flatness, transparency, heat resistance, acidic resistance, alkali resistance, and storage stability.

Yet another embodiment of the present invention provides a liquid crystal display (LCD) and an image sensor including the color filter.

The embodiments of the present invention are not limited to the above technical purposes, and a person of ordinary skill in the art can understand other technical purposes.

According to one embodiment of the present invention, provided is a one-solution type thermosetting resin composition for a protective film of a color filter that includes a self-curing copolymer including 5 mol % to 80 mol % of a repeating unit represented by Chemical Formula 1, 5 mol % to 40 mol % of a repeating unit represented by Chemical Formula 2, 5 mol % to 40 mol % of a repeating unit represented by Chemical Formula 3, and 5 mol % to 40 mol % of a repeating unit represented by Chemical Formula 4; (B) an epoxy resin; (C) a base-generating agent; and (D) an organic solvent:

[Chemical Formula 1]

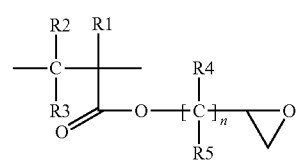

wherein R1 to R5 are independently selected from the group consisting of hydrogen, an alkyl, a halogen, and a haloalkyl, and n is an integer from 1 to 10;

[Chemical Formula 2]

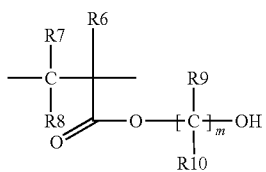

wherein R6 to R10 are independently selected from the group consisting of hydrogen, an alkyl, a halogen, and a haloalkyl, and m is an integer from 1 to 10;

[Chemical Formula 3]

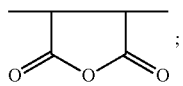

and

[Chemical Formula 4]

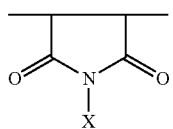

wherein X is a functional group represented by Formula 5a, Formula 5b or Formula 5:

[Chemical Formula 5a]

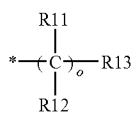

[Chemical Formula 5b]

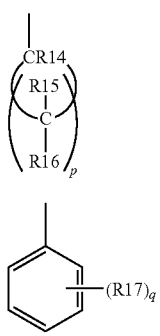

[Chemical Formula 5c]

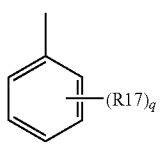

wherein R11 to R16 are independently selected from the group consisting of hydrogen, an alkyl, a halogen, and a haloalkyl, R17 is selected from the group consisting of hydrogen, a lower alkyl, a lower alkoxy, a halogen, and a haloalkyl, o is an integer ranging from 1 to 4, p is an integer ranging from 4 to 12, and q is an integer ranging from 1 to 5.

According to one embodiment of the present invention, provided is a color filter including a protective film prepared by curing the one-solution type thermosetting resin composition.

According to another embodiment of the present invention, provided is a liquid crystal display (LCD) and an image sensor including the color filter.

In the present specification, when specific definition is not provided, "an alkyl" refers to a $C_1$-$C_{15}$ alkyl, "an alkenyl" refers to a $C_2$-$C_{16}$ alkenyl, "an alkynyl" refers to a $C_2$-$C_{16}$ alkynyl, "an aryl" refers to a $C_6$-$C_{18}$ aryl, "an arylalkyl" refers to a $C_7$-$C_{18}$ arylalkyl, "a heteroalkyl" refers to a $C_1$-$C_{20}$ heteroalkyl, "a heterocycle" refers to a $C_2$-$C_{20}$ heterocycle, "a heteroarylalkyl" refers to a $C_3$-$C_{20}$ heteroarylalkyl, "a cycloalkyl" refers to a $C_3$-$C_{15}$ cycloalkyl, "a cycloalkenyl" refers to a $C_3$-$C_{15}$ cycloalkenyl, "a cycloalkynyl" refers to a $C_6$-$C_{15}$ cycloalkynyl, "a heterocycloalkyl" refers to a $C_3$-$C_{20}$ heterocycloalkyl, and "an alkoxy" refers to a $C_1$-$C_{20}$ alkoxy.

The term "lower alkyl" refers to a $C_1$-$C_4$ alkyl, the term "lower alkoxy" refers to a $C_1$-$C_4$ alkoxy, and the term "haloalkyl" refers to a $C_1$-$C_{15}$ alkyl substituted with a halogen.

In the present specification, the term "substituted" refers to one substituted with at least substituent selected from the group consisting of a halogen (F, Br, Cl, or I), a hydroxyl, an alkoxy, a nitro, a cyano, an amino, an azido, an amidino, a hydrazino, a hydrazono, a carbonyl, a carbamyl, a thiol, an ester, a carboxyl or a salt thereof, sulfonic acid or a salt thereof, phosphoric acid or a salt thereof, a $C_1$-$C_{15}$ alkyl, a $C_2$-$C_{16}$ alkenyl, a $C_2$-$C_{16}$ alkynyl, a $C_6$-$C_{18}$ aryl, a $C_7$-$C_{18}$ arylalkyl, a $C_1$-$C_{20}$ heteroalkyl, a $C_2$-$C_{20}$ heterocycle, a $C_3$-$C_{20}$ heteroaryl alkyl, a $C_3$-$C_{15}$ cycloalkyl, a $C_3$-$C_{15}$ cycloalkenyl, a $C_6$-$C_{15}$ cycloalkynyl, and a $C_3$-$C_{20}$ heterocycloalkyl.

When a one-solution type thermosetting resin composition according to the present invention is used to fabricate a protective film of a color filter, the protective film of a color filter can have excellent flatness, close-contacting property, transmission property, heat resistance, and chemical resistance, and particularly, excellent storage stability. As a result, the protective film of a color filter can be applied to a liquid crystal display (LCD) or an image sensor.

DETAILED DESCRIPTION OF THE INVENTION

Exemplary embodiments of the present invention will hereinafter be described in detail. However, these embodiments are only exemplary, and the present invention is not limited thereto.

First, each component of a one-solution type thermosetting resin composition for a protective film of a color filter according to one embodiment of the present invention will be examined in detail.

(A) Self-Curing Copolymer

The self-curing copolymer includes (meth)acrylate having an epoxy cyclic structure at a side chain, (meth)acrylate having an OH radical at the terminal, acid anhydride, and maleimide having a substituent. Preferably, the self-curing copolymer includes 5 mol % to 80 mol % of a repeating unit represented by Chemical Formula 1, 5 mol % to 40 mol % of a repeating unit represented by Chemical Formula 2, 5 mol % to 40 mol % of a repeating unit represented by Chemical Formula 3, and 5 mol % to 40 mol % of a repeating unit represented by Chemical Formula 4:

[Chemical Formula 1]

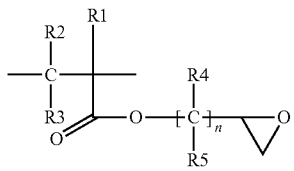

wherein, R1 to R5 are independently selected from the group consisting of hydrogen, an alkyl, a halogen, and a haloalkyl, and preferably, R1 to R5 are independently hydrogen or a methyl, and n is an integer from 1 to 10;

[Chemical Formula 2]

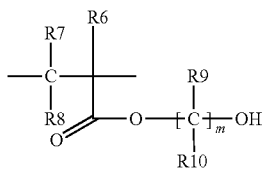

wherein R6 to R10 are independently selected from the group consisting of hydrogen, an alkyl, a halogen, and a haloalkyl, and preferably, R6 to R10 are independently hydrogen or a methyl, and m is an integer from 1 to 10;

[Chemical Formula 3]

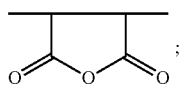

and

[Chemical Formula 4]

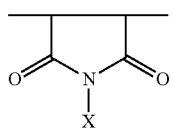

wherein X is a functional group represented by Formula 5a, Formula 5b or Formula 5:

[Chemical Formula 5a]

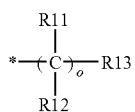

[Chemical Formula 5b]

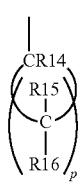

[Chemical Formula 5c]

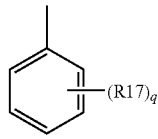

wherein R11 to R16 are independently selected from the group consisting of hydrogen, an alkyl, a halogen, and a haloalkyl, and preferably, R11 to R16 are hydrogen or a methyl; R17 is selected from the group consisting of hydrogen, a lower alkyl, a lower alkoxy, a halogen, and a haloalkyl, o is an integer ranging from 1 to 4, p is an integer ranging from 4 to 12, and q is an integer ranging from 1 to 5.

The self-curing copolymer further includes a repeating unit derived from a compound selected from the group consisting of a (meth)acrylate series such as methyl(meth)acrylate, ethyl (meth)acrylate, propyl(meth)acrylate, isopropyl(meth)acrylate, butyl(meth)acrylate, or benzyl(meth)acrylate; an acrylamide series such as N-methylacrylamide, N-ethylacrylamide, N-isopropylacrylamide, N-methylolacrylamide, N-methylmethacrylamide, N-ethylmethacrylamide, N-isopropylmethacrylamide, N-methylolmethacrylamide, N,N-dimethylacrylamide, N,N-diethylacrylamide, N,N-dimethylmethacrylamide, or N,N-diethylmethacrylamide; a styrene series such as styrene, α-methylstyrene, or hydroxystyrene; an amide series such as N-vinylpyrrolidone, N-vinylformamide, or N-vinylamide; and an imidazole series such as N-vinylimidazole, as needed in order to improve coating, film hardness, and affinity with upper and lower layers.

The self-curing copolymer has no particular limit in molecular weight, but may preferably have a weight average molecular weight ranging from 1000 to 1,000,000. More preferably it may have a weight average molecular weight ranging from 5000 to 50,000. When the self-curing copolymer has a molecular weight within the range, it can have excellent curability, solvent-solubility, and coating ability.

The self-curing copolymer may be included in an amount ranging from 1 to 60 wt % based on the total weight of the one-solution type thermosetting resin composition. Preferably, it may be included in an amount ranging from 3 to 30 wt %. When it is included in the above range, it can have excellent coating ability and efficiently protects a layer from gas generated from a lower layer.

The self-curing copolymer can be prepared in a conventional method without any particular limit. However, it can also be prepared by using a radical polymerization initiator in the same organic solvent as is included in the one-solution type thermosetting resin composition for a protective film of a color filter according to one embodiment of the present invention.

In other words, an organic solvent used for copolymerization of the self-curing copolymer has no particular limit, but may include the same organic solvent as an organic solvent necessarily included in the one-solution type thermosetting resin composition for a protective film of a color filter according to the prevent invention.

The organic solvent used during copolymerization of the self-curing copolymer may be selected from the group consisting of ethyleneglycol series such as ethyleneglycol, diethyleneglycol, and so on; ethyleneglycolether series such as ethyleneglycol monomethylether, diethyleneglycol monomethylether, ethyleneglycol diethylether, diethyleneglycol dimethylether, and so on; ethyleneglycol etheracetate series such as ethyleneglycol monoethyletheracetate, diethyleneglycol monoethyletheracetate, diethyleneglycol monobutylether acetate, and so on; propyleneglycol series such as propyleneglycol; propyleneglycol ether series such as propyleneglycol monomethylether, propyleneglycol monoethylether, propyleneglycol monopropylether, propylenemonobutylether, propyleneglycol dimethylether, dipropyleneglycol dimethylether, propyleneglycol diethylether, dipropyleneglycoldiethylether, and so on; propyleneglycol etheracetate series such as propyleneglycol monomethylether acetate, dipropyleneglycol monoethyletheracetate, and so on; amide series such as N-methylpyrrolidone, dimethyl formamide, dimethyl acetamide, and so on; ketone series such as methylethyl ketone (MEK), methylisobutyl ketone (MIBK), cyclohexanone, and so on; petroleum series such as toluene, xylene, solvent naphtha, and so on; ester series such as ethyl acetate, butyl acetate, ethyl lactate, and so on; and mixtures thereof.

In addition, the organic solvent used for copolymerization of the self-curing copolymer is included to a degree that the self-curing copolymer may have a concentration ranging from 5 to 60 wt %. Preferably, the self-curing copolymer may have a concentration ranging from 15 to 35 wt %. When the self-curing copolymer has a concentration within the range, its polymerization speed can be easily controlled. In addition, it can be easily handled since it has appropriate viscosity, and does not leave any unreacted monomer.

A polymerization initiator used for polymerization of the self-curing copolymer may include a conventional one such as a thermal polymerization initiator, a photopolymerization initiator, a redox-based initiator, and the like. However, it can also include a radical polymerization initiator belonging to a peroxide group, an azo group, and the like, since they can be easily handled and are easily regulated regarding reaction speed and molecular weight.

The peroxide-based polymerization initiator may be methylethylketoneperoxide, cyclohexanoneperoxide, methylcyclohexanoneperoxide, acetylacetoneperoxide, 1,1-bis(tert-butylperoxy)-3,3,5-trimethylcyclohexane, 1,1-bis(tert-butylperoxy)cyclohexane, 1,1-bis(tert-hexylperoxy)-3,3,5-trimethylcyclohexane, 1,1-bis(tert-hexylperoxy)cyclohexane, 1,1-bis(tert-butylperoxy)cyclododecane, isobutylperoxide, lauroylperoxide, succinic acid peroxide, 3,5,5-trimethylhexanoylperoxide, benzoylperoxide octanoylperoxide, stearoylperoxide, diisopropylperoxydicarbonate, dinormalpropylperoxydicarbonate, di-2-ethylhexylperoxydicarbonate, di-2-ethoxyethylperoxydicarbonate, di-2-methoxybutylperoxydicarbonate, bis-(4-tert-butylcyclohexyl)peroxydicarbonate, ($\alpha,\alpha$-bis-neodecanoylperoxy)diisopropylbenzene, peroxyneodecanoic acidcumylester, peroxyneodecanoic acidoctylester, peroxyneodecanoic acidhexylester, peroxyneodecanoic acid-tert-butylester, peroxypyvalic acid-tert-hexylester, peroxypyvalic acid-tert-butylester, 2,5-dimethyl-2,5-bis (2-ethylhexanoylperoxy)hexane, 1,1,3,3-tetramethylbutylperoxy-2-ethylhexanoate, peroxy-2-ethylhexanoic acid-tert-hexylester, peroxy-2-ethylhexanoic acid-tert-butylester, peroxy-2-ethylhexanoic acid-tert-butylester, peroxy-3-methylpropionic acid-tert-butylester, peroxylauric acid-tert-butylester, tert-butylperoxy-3,5,5-trimethylhexanoate, tert-hexylperoxyisopropylmonocarbonate, tert-butylperoxyisopropylcarbonate, 2,5-dimethyl-2,5-bis (benzoylperoxy)hexane, peracetic acid-tert-butylester, perbenzoic acid-tert-hexylester, perbenzoic acid-tert-butylester, and so on. In addition, the peroxide-based polymerization initiator can be used as an oxidation-reduction initiator by adding a reducing agent thereto.

The azo-based polymerization initiator may be 1,1-azobis (cyclohexane-1-carbonitrile), 2,2'-azobis(2-methyl-butyronitrile), 2,2'-azobisbutyronitrile, 2,2'-azobis(2,4-dimethylvaleronitrile), 2,2'-azobis(2,4-dimethyl-4-methoxyvaleronitrile), 2,2'-azobis(2-amidino-propane) hydrochloride, 2,2'-azobis[2-(5-methyl-2-imidazoline-2-yl) propane]hydrochloride, 2,2'-azobis[2-(2-imidazoline-2-yl) propane]hydrochloride, 2,2'-azobis[2-(5-methyl-2-imidazoline-2-yl)propane], 2,2'-azobis2-methyl-N-(1,1-bis (2-hydroxymethyl)-2-hydroxyethyl]propionamide, 2,2'-azobis[2-methyl-N-(2-hydroxyethyl)propionamide], 2,2'-azobis (2-methyl-propionamide)dihydrate, 4,4'-azobis(4-cyano-valeric acid), 2,2'-azobis(2-hydroxymethylpropinonitrile), 2,2'-azobis(2-methylpropionic acid)dimethylester(dimethyl-2,2'-azobis (2-methylpropinonate)), cyano-2-propylazoformamide, and so on.

In addition, a conventional molecular weight controlling agent such as a chain transfer agent, a chain termination, a polymerization accelerator, and the like, other than the peroxide-based polymerization initiator and the azo-based polymerization initiator, can be added in order to secure an appropriate molecular weight range during polymerization of the self-curing copolymer. For example, it may include mercaptopropionic acid, mercaptopropionic acid ester, thioglycol, thioglycerine, dodecyl mercaptan, $\alpha$-methylstyrene dimer, and the like.

On the other hand, solvents other than the organic solvent included in the polymerization may be added to the polymerization in order to support solubility of components and regulate leveling and drying speed.

In addition, the polymerized copolymer can be extracted as a solid for the purpose of refining, storage, changing a solvent, and the like. The extracted solid can be used to prepare a one-solution type thermosetting resin composition for a protective film of a color filter. The extraction method has no particular limit, but may include spray drying, film drying, dropping in a poor solvent, reprecipitation, and the like.

(B) Epoxy Resin

The epoxy resin may be selected from the group consisting of a bisphenol A type of epoxy, a bisphenol F type of epoxy, a phenolnovolac epoxy, a cresolnovolac epoxy, an alicyclic epoxy resin, and mixtures thereof.

The epoxy resin may preferably have a weight average molecular weight ranging from 50 to 10,000. More preferably, it may have a weight average molecular weight ranging from 500 to 3000. When the epoxy resin has a weight average molecular weight within the range, it can exhibit excellent layer hardness and coating properties.

In addition, the epoxy resin may preferably be included in an amount of 1 to 60 wt % based on the total amount of the one-solution type thermosetting resin composition. More preferably, it may be included in an amount of 3 to 30 wt %. When it is included within the above range, it can improve coating and dimensional stability of the prepared protective film.

(C) Base-Generating Agent

The base-generating agent may include a thermal base-generating agent, which does not react at room temperature but generates a base when it is heated, and can thereby can prevent deterioration of storage stability and improve prevention of wrinkle formation on the surface of the protective film. As a result, it can improve the problems of a conventional amine. In particular, the thermal base-generating agent may include a compound represented by the following Formula 6.

[Chemical Formula 6]

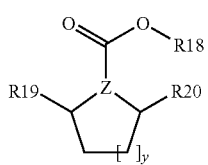

In the above Formula 6, the Z may include one of the elements except for C. Preferably, it may include N or P.

R18 may be selected from the group consisting of a substituted or unsubstituted alkyl, a substituted or unsubstituted aryl, a substituted or unsubstituted arylalkyl, and a substituted or unsubstituted cycloalkyl.

R19 and R20 may be independently selected from the group consisting of hydrogen, a substituted or unsubstituted alkyl, a substituted or unsubstituted aryl, a substituted or unsubstituted arylalkyl, and a substituted or unsubstituted cycloalkyl, and y is an integer ranging from 0 to 5.

The alkyl includes a substituted or unsubstituted $C_1$-$C_{15}$ alkyl.

In particular, the unsubstituted alkyl may include a methyl, an ethyl, a propyl, an isopropyl, an isobutyl, a sec-butyl, a pentyl, an iso-amyl, a hexyl, and the like.

In addition, the substituted $C_1$-$C_{15}$ alkyl indicates that at least one of hydrogen atoms in the alkyl is substituted with a halogen atom (F, Cl, Br, or I), a hydroxy, an alkoxy, a nitro, a cyano, an amino, an amidino, an azido, a hydrazino, a hydrazono, a carbonyl, a carbamyl, a thiol, an ester, a carboxyl or salts thereof, a sulfonic acid or salts thereof, a phosphoric acid or salts thereof, a substituted or unsubstituted $C_1$-$C_{15}$ alkyl, a substituted or unsubstituted $C_2$-$C_{16}$ alkenyl, a substituted or unsubstituted $C_2$-$C_{16}$ alkynyl, an substituted or unsubstituted $C_6$-$C_{18}$ aryl, a substituted or unsubstituted $C_7$-$C_{18}$ arylalkyl, a substituted or unsubstituted $C_1$-$C_{20}$ heteroalkyl, a substituted or unsubstituted $C_2$-$C_{20}$ heterocycle, a substituted or unsubstituted $C_3$-$C_{20}$ heteroarylalkyl, a substituted or unsubstituted $C_3$-$C_{15}$ cycloalkyl, a substituted or unsubstituted $C_3$-$C_{15}$ cycloalkenyl, a substituted or unsubstituted $C_6$-$C_{15}$ cycloalkynyl, or a substituted or unsubstituted $C_3$-$C_{20}$ heterocycloalkyl.

The aryl indicates a carbocycle aromatic system with 6 to 18 carbon atoms including at least one cyclic, and can be used singularly or in combination. The cyclics can be attached or amalgamated in a pendant method. In general, an aryl includes an aromatic radical such as a phenyl, a naphthyl, a tetrahydronaphthyl, an indan, a cyclopentadienyl, and a biphenyl. At least one hydrogen of the aryl may be substituted with the same substituent as aforementioned in an alkyl.

The arylalkyl is formed by combining an aryl as defined above with a lower alkyl, for example, a lower alkyl radical with 1 to 4 carbons such as a methyl, an ethyl, a propyl, and the like. In particular, an arylalkyl may include a benzyl, a phenylethyl, and the like. At least one hydrogen of the arylalkyl may be replaced with the same substituent as aforementioned.

The cyclo alkyl indicates a cyclic radical with 3 to 15 carbon atoms. At least one hydrogen of the cycloalkyl can also be replaced with the same substituent as aforementioned in an alkyl.

The base-generating agent may preferably be included in an amount ranging from 0.0001 to 0.1 wt % based on the total weight of the one-solution type thermosetting resin composition. More preferably, it may be included in an amount ranging from 0.0001 to 0.03 wt %. When it is used within the range, it can improve the cross-linking characteristic when it is heated. It also may not remain as a monomer residue, which acts as an impurity.

(D) Organic Solvent

The organic solvent has no particular limit, as long as it can dissolve the self-curing copolymer (A). A usable organic solvent may be selected from the group consisting of ethyleneglycol series such as ethyleneglycol, diethyleneglycol, and so on; ethyleneglycolether series such as ethyleneglycolmonomethylether, diethyleneglycolmonomethylether, ethyleneglycoldiethylether, diethyleneglycoldimethylether, and so on; ethyleneglycoletheracetate series such as ethyleneglycolmonoethyletheracetate, diethyleneglycolmonoethyletheracetate, diethyleneglycolmonobutyletheracetate, and so on; propyleneglycol series such as propyleneglycol, and so on; propyleneglycolether series such as propyleneglycolmonomethylether, propyleneglycolmonoethylether, propyleneglycolmonopropylether, propylenemonobutylether, propyleneglycoldimethylether, dipropyleneglycoldimethylether, propyleneglycoldiethylether, dipropyleneglycoldiethylether, and so on; propyleneglycoletheracetate series such as propyleneglycolmonomethyletheracetate, dipropyleneglycolmonoethyletheracetate, and so on; amide series such as N-methylpyrrolidone, dimethyl formamide, dimethyl acetamide, and so on; ketone series such as methylethylketone (MEK), methylisobutylketone (MIBK), cyclohexanone, and so on; petroleum series such as toluene, xylene, solvent naphtha, and so on; ester series such as ethyl acetate, butyl acetate, ethyl lactate, and so on; and mixtures thereof.

The organic solvent may be included as the balance in the one-solution type thermosetting resin composition.

According to one embodiment of the present invention, the one-solution type thermosetting resin composition for a protective film of a color filter including a self-curing copolymer (A); an epoxy resin (B); a base-generating agent (C); and an organic solvent (D) as the balance may additionally include another polymer in order to improve etching and alkali resistance, and to adjust fluidity.

The added polymer has no particular limit, but may include poly(meth)acrylate, a nylon, a polyester, a polyimide, a silicon polymer, and the like.

Herein, the polymer may preferably be included in an amount of less than 50 parts by weight based on 100 parts by weight of the self-curing copolymer (A). More preferably, it may be included in an amount ranging from 5 to 30 parts by weight. When it is used within the above range, the one-solution type thermosetting resin composition may have appropriate fluidity and improved etching resistance, alkali resistance, and the like.

In addition, the one-solution type thermosetting resin composition may additionally include an amine compound, a phosphorous compound, a boron compound, an antimony compound, a carbon acid compound, an organic sulfonic acid compound, and the like, as a catalyst for a thermal curing reaction. Herein, the thermal curing reaction catalyst may be included in an amount of less than 10 parts by weight based on 100 parts by weight of the self-curing copolymer in terms of storage stability. Preferably, it is included in an amount ranging from 0.001 to 5 parts by weight.

In addition, the one-solution type thermosetting resin composition may additionally include a surfactant in order to improve coating ability.

Exemplary examples of the surfactant include a silicon-based surfactant such as TSF400, TSF401, TSF410, TSF4440, or the like from GE Toshiba Silicon Co., Ltd.; a fluorine-based surfactant such as Megaface F142D, F172, F-172D, F177P, F-470, F-471, F-475, and the like from DaiNippon Ink & Chemicals Inc.; and a silicon-based surfactant including a fluorine atom such as Megaface R-08, BL20, F443, and the like from DaiNippon Ink & Chemicals Inc.

Herein, the surfactant may be included in an amount of less than 10 parts by weight based on 100 parts by weight of a self-curing copolymer. Preferably, it may be included in an amount ranging from 0.001 to 5 parts by weight.

The one-solution type thermosetting resin composition may be prepared by mixing a conventional component such as an antioxidant, an infrared stabilizer, a plasticizer, a leveling agent, a coupling agent, a filler, and the like, in addition to the surfactant.

A conventional self-curing copolymer is generally obtained from a cross-linking reaction of an epoxy and an acid. According to the present invention, a one-solution type thermosetting resin composition includes a self-curing copolymer prepared by using an acid anhydride such as anhydrous maleic acid instead of (meth)acrylic acid, and is thereby obtained by a reaction of epoxy and acid produced after the reaction of alcohol and the acid anhydride.

As a result, it can simultaneously improve both storage stability and the cross-linking characteristic, while a conventional thermosetting resin composition should consider balances between storage stability and the cross-linking characteristic.

In addition, since it includes a base-generating agent, it can have improved storage stability and protection against ITO thick film wrinkle formation, compared with a conventional resin composition.

According to another embodiment of the present invention, provided is a color filter including a protective film prepared by using the one-solution type thermosetting resin composition.

The protective film of a color filter can be prepared by coating a one-solution type thermosetting resin composition according to one embodiment of the present invention on a substrate, and then drying and heat-curing it.

Herein, the coating of the one-solution type thermosetting resin composition can be performed by a common method, but in particular, the method may include screen coating, curtain coating, blade coating, spin coating, spray coating, dip coating, flow coating, roll coating, slit coating, and the like.

The one-solution type thermosetting resin composition may be coated to have a thickness of 0.3 to 2.0 μm on a substrate after drying. Preferably, it may have a thickness ranging from 0.1 to 5.0 μm. When the thickness is within the above range, it can have sufficient planarized performance against bumps and decreased drying and heating time while not have deteriorated transmittance, resultantly increasing productivity.

Then, when the drying-heating volatilizes a solvent therein, a strong layer can be formed due to the cross-linking reaction.

The drying and heating can be simultaneously or independently performed. However, the latter can decrease bubbles or cracks, which strong heat might cause.

The drying can be performed by using any device without any particular limit, and may include a warm drier, an infrared drier, a hot plate, and the like. In addition, the drying can be performed at a temperature ranging from 50 to 150° C. However, the drying time can vary depending on capacity of a drier, amount of air movement, temperature, and thickness of a layer, but may be in a range of 1 to 10 minutes.

The heating process has no particular limit in terms of device, but may include a warm oven, an infrared oven, a hot plate, and the like. The heating can be performed at a temperature ranging from 150 to 250° C. Preferably, it may be performed at a temperature ranging from 200 to 240° C. When the heat treatment is performed within the above range, it can sufficiently encourage the curing reaction while discouraging depolymerization or carbonization of a polymer compound, such that performance of a prepared layer is not deteriorated.

When a protective film is prepared by the aforementioned method, it can have excellent storage stability as well as excellent flatness, close-contacting property, transmission properties, heat resistance, and chemical resistance. Accordingly, when it is applied as a protective film of a color filter of a liquid crystal display (LCD) and an image sensor, it can contribute to improving their performance.

Hereinafter, the present invention will be illustrated in more detail through examples and comparative examples, but is not confined therewith.

Synthesis Example 1500 mg of ditertiarybutyl dicarbonate was added in a dropwise fashion to 30 ml of a methylene chloride solution including 1580 mg of 2,6-dimethyl piperidine at 0° C. while agitating it. Next, 2000 mg of triethyl amine was added to this solution. The resulting solution was heated to room temperature and then agitated for 2 hours. After the reaction was complete, which was checked by using thin layer chromatography (hereinafter referred to as "TLC"), 100 ml of a 5% HCl solution was added thereto in a dropwise fashion. Then, ethyl acetate was used twice to extract 500 ml of an organic solution layer. The extracted solution was neutralized by adding 100 ml of a saturated sodium bicarbonate solution in a dropwise fashion thereto. Then, 500 ml of an organic solution layer was extracted twice by using ethylacetate.

Then, magnesium sulfate (MgSO$_4$) was used to remove moisture from the resulting solution. The acquired product was vacuum-dried, gaining a 98% yield of a compound represented by Chemical Formula 7.

[Chemical Formula 7]

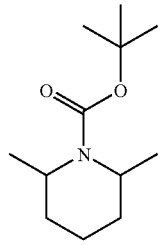

Example 1

300 g of propylene glycol monomethylether acetate was put in a 500 Ml flask with a reflux cooler and an agitator. Then, it was heated to 80° C. while agitating it. Then, a mixture of 32 g of glycidyl methacrylate, 15 g of 2-hydroxyethyl methacrylate, 15 g of anhydrous maleic acid, 10 g of N-phenyl maleimide, 28 g of styrene, and 8 g of dimethyl-2,2'-azobis (2-methylpropionate) was added to the above resulting product in the flask in a dropwise fashion for 1 to 1.5 hours, while maintaining agitation at the same temperature of 80° C. When the mixture was completely added in a dropwise fashion, the resulting mixture was reacted for 4 to 5 hours, while maintaining agitation at the same temperature of 80° C., acquiring a transparent polymer solution (A) including 25.2 wt % of a solid powder. This solution was measured in a gel permeation chromatography method (hereinafter referred to as GPC). As a result, its weight average molecular weight, reduced to polystyrene was 22,000.

Next, 3.4 g of an epoxy resin (Epikote 152, JER Co., Ltd.), 1.5 g of a silane coupling agent (S-510, Chisso Co.), 0.11 g of a surfactant (F-475, DIC Inc.), 0.01 g of a base-generating agent prepared according to Synthesis Example 1, and 30 g of propyleneglycol monomethylether acetate were added to 40 g of the prepared polymer solution (A). The resulting mixture was sufficiently agitated and dissolved, and then filtered to acquire a one-solution type thermosetting composition (F) for a protective film of a color filter.

The one-solution type thermosetting composition for a protective film of a color filter was coated on a 0.7 mm-thick glass substrate (No. 1737, Corning Inc.) with a spin coater, dried for 3 minutes in an 80° C. drier, and solidified for 20 minutes at 230° C., gaining a 1.5 μm-thick transparent protective film and a color filter.

Example 2

300 g of propyleneglycol monomethylether acetate was put in a 500 Ml flask with a reflux cooler and an agitator, and was then agitated and heated to 80° C. Then, a mixture of 32 g of methacrylic acidglycidyl, 10 g of 2-hydroxyethylmethacrylate, 20 g of anhydrous maleic acid, 10 g of N-phenylmaleimide, 28 g of styrene, and 8 g of dimethyl-2,2'-azobis(2-methylpropinonate) was added to the flask in a dropwise fashion for 1 to 1.5 hours, while maintaining the temperature at 80° C. When the mixture was completely added, the resulting mixture was reacted for 4 to 5 hours at the same temperature of 80° C., gaining a transparent polymer solution (B) including 23.5 wt % of a solid powder. The solution was measured in a gel permeation chromatography method. As a result, its weight average molecular weight, reduced to polystyrene was 24,000.

Next, a one-solution type thermosetting composition (G) for a protective film of a color filter was prepared according to the same method as in Example 1, except for using 40 g of the polymer solution (B) instead of the polymer solution (A).

Then, a 1.5 μm-thick transparent protective film and a color filter were acquired according to the same method as in Example 1, except for using the one-solution type thermosetting composition (G) for a protective film of a color filter instead of the one-solution type thermosetting composition (F) for a protective film of a color filter.

Example 3

300 g of propylene glycol monomethylether acetate was put in a 500 Ml flask with a reflux cooler and an agitator, and was then heated to 80° C. during the agitation. Next, a mixture of 32 g of glycidyl methacrylate, 10 g of 2-hydroxyethylmethacrylate, 20 g of anhydrous maleic acid, 5 g of N-phenylmaleimide, 33 g of styrene, and 8 g of dimethyl-2,2'azobis(2-methylpropinonate) was added to the flask in a dropwise fashion for 1 to 1.5 hours, while it was maintained at the same temperature of 80° C. When the mixture was completely added, the resulting mixture was reacted at the same temperature of 80° C. for 4 to 5 hours while maintaining the agitation, acquiring a polymer solution (C) including 24.8 wt % of solid powder. This solution was measured in a gel permeation chromatography method. As a result, its weight average molecular weight, reduced to polystyrene was 27,000.

Then, a one-solution type thermosetting composition (H) for a protective film of a color filter was prepared according to the same method as in Example 1, except for using 40 g of the polymer solution (C) instead of the polymer solution (A).

Then, a 1.5 nm-thick transparent protective film and a color filter were prepared by using the prepared one-solution type thermosetting composition (H) for a protective film of a color filter instead of the one-solution type thermosetting composition (F) for a protective film of a color filter.

Comparative Example 1

A 1.5 μm-thick transparent protective film and a color filter were prepared without a base-generating agent according to the same method as in Example 1.

Comparative Example 2

A 1.5 μm-thick protective film and a color filter were prepared according to the same method as in Example 1, while including 0.01 g of imidazole instead of a base-generating agent.

Property Evaluation

The glass substrates and color filters according to Examples 1 to 3 and Comparative Examples 1 and 2 were evaluated regarding flatness, close-contacting property, chemical resistance, storage stability, and ITO thick film wrinkles by the following method. In addition, the one-solution type thermosetting resin compositions according to Examples 1 to 3 and Comparative Examples 1 and 2 were evaluated regarding storage stability. The results are shown in the following Table 1.

Flatness Evaluation

Flatness was evaluated by a central height difference of red and green color pixels of a dummy color filter (a height difference between pixels). Then, the color filters coated with protective films according to Examples 1 to 3 and Comparative Examples 1 and 2 were evaluated regarding central height difference of red and green color pixels. Next, R was calculated as a rate of a difference d1 between pixels before coating a protective film vs. a difference d2 between pixels after coating the protective film according to the following Equation 1. Then, a protective film composition of the present invention was evaluated regarding flatness on a 5-point scale, based on the following reference.

$$R = d2/d1 \qquad \text{[Equation 1]}$$

In the above equation, R>0.4 earns 1 point, $0.4 \leq R \leq 0.3$ earns 2 points, $0.3 < R \leq 0.2$ earns 3 points, $0.2 < R \leq 0.1$ earns 4 points, and R<0.1 earns 5 points. Accordingly, 1 point indicates low flatness, while 5 points indicates high flatness.

Close-Contacting Property and Chemical Resistance Test

Close-contacting property was tested by putting 100 cross-cuts with checker scales on the protective films according to Examples 1 to 3 and Comparative Examples 1 and 2, performing a peeling test (cross-cut test) with a cellophane tape, and then examining peeling degrees with the naked eye.

In addition, close-contacting property test was performed by respectively dipping the protective film in 40° C. N-methyl-2-pyrrolidone (NMP) as an organic solvent, a 10% potassium hydroxide aqueous solution as a base, and an etchant solution (Cyantek Corporation LCE-12K) as an acid for 30 minutes in the following method.

Then, each solution was evaluated regarding chemical resistance by marking "Pass" when peeling was 100 (after dipping)/100 (before dipping) but marked as "Non-pass" when peeling was less than 100.

Storage Stability Evaluation

The thermosetting compositions according to Examples 1 to 3 and Comparative Examples 1 and 2 were measured regarding initial viscosity and then regarding viscosity every 3 days after they were respectively put in a 10 Ml vial and stored in a 40° C. incubator. The viscosity was measured 6 times at 0, 3, 6, 9, 12, and 15 days in total over 15 days, and a day when the viscosity increased over 10% relative to each initial viscosity was reported. In case of Examples 1 to 3, the viscosity did not approach a 10% increase at the end of 15 days, and therefore the expectation day when the viscosity would increase over 10% relative to each initial viscosity was calculated by extrapolation.

ITO Film Wrinkle Characteristic Evaluation

ITO was sputtered on the protective films according to Examples 1 to 3 and Comparative Examples 1 and 2, and was then annealed at 230° C. for 40 minutes. Then, film wrinkles were measured at the area from the center of a specimen to a diameter of 5 cm, with a 10-point scale ranging from 1 to 10.

Herein, 1 point indicates many wrinkles, while 10 points indicates extremely few wrinkles.

TABLE 1

| Item | Flatness | Close-contacting property | Chemical resistance | | | ITO thick film wrinkle | Storage stability |
|---|---|---|---|---|---|---|---|
| | | | acid | base | organic solvent | | |
| Example 1 | 4 | 100/100 | Pass | Pass | Pass | 10 | 20 |
| Example 2 | 4 | 100/100 | Pass | Pass | Pass | 10 | 20 |
| Example 3 | 4 | 100/100 | Pass | Pass | Pass | 10 | 20 |
| Comparative Example 1 | 4 | 99/100 | Pass | Non-pass | Non-pass | 2 | 15 |
| Comparative Example 2 | 4 | 100/100 | Pass | Pass | Pass | 10 | 5 |

As shown in Table 1, the protective films prepared of the one-solution type thermosetting resin composition according to Examples 1 to 3 were found to have excellent close-contacting property and chemical resistance, and particularly good ITO film wrinkle effects as well as excellent storage stability.

In addition, since the protective films of Examples 1 to 3 included a base-generating agent, they had better ITO film wrinkle effects and storage stability than that of Comparative Example 2 including an amine.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A one-solution type thermosetting resin composition for a protective film of a color filter comprising:
   (A) a self-curing copolymer;
   (B) an epoxy resin, other than the self-curing polymer;
   (C) a base-generating agent; and
   (D) an organic solvent;
   wherein the self-curing copolymer comprises 5 mol % to 80 mol % of a repeating unit represented by Chemical Formula 1; 5 mol % to 40 mol % of a repeating unit represented by Chemical Formula 2; 5 mol % to 40 mol % of a repeating unit represented by Chemical Formula 3; and 5 mol % to 40 mol % of a repeating unit represented by Chemical Formula 4:

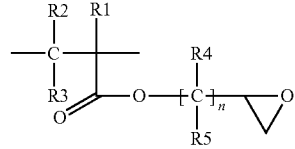

[Chemical Formula 1]

wherein R1 to R5 are independently selected from the group consisting of hydrogen, an alkyl, a halogen, and a haloalkyl; and n is an integer of from 1 to 10;

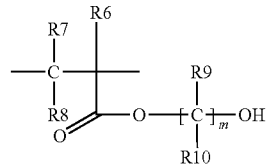

[Chemical Formula 2]

wherein R6 to R10 are independently selected from the group consisting of hydrogen, an alkyl, a halogen, and a haloalkyl; and m is an integer of from 1 to 10;

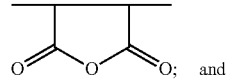

[Chemical Formula 3]

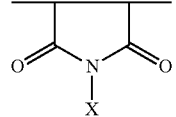

[Chemical Formula 4]

wherein X is a group represented by Formula 5a, Formula 5b or Formula 5c:

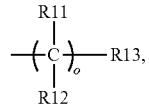

{Chemical Formula 5a]

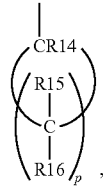

[Chemical Formula 5b]

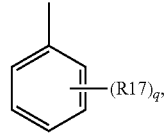

[Chemical Formula 5c]

wherein R11 to R16 are independently selected from the group consisting of hydrogen, an alkyl, a halogen, and a haloalkyl; R17 is selected from the group consisting of a hydrogen, a lower alkyl, a lower alkoxy, a halogen, and a haloalkyl; o is an integer of from 1 to 4; p is an integer of from 4 to 12; and q is an integer of from 1 to 5.

2. The composition of claim 1, wherein the self-curing copolymer (A) further comprises a repeating unit selected from the group consisting of a (meth)acrylate series, an acrylamide series, a styrene series, an amide series, an imidazole series, and combinations thereof.

3. The composition of claim 1, wherein the self-curing copolymer has a weight average molecular weight of 1000 to 1,000,000.

4. The composition of claim 1, wherein the epoxy resin (B) is selected from the group consisting of a bisphenol A epoxy, a bisphenol F epoxy, a phenolnovolac epoxy, a cresolnovolac epoxy, a cyclic epoxy resin, and mixtures thereof.

5. The composition of claim 1, wherein the base-generating agent (C) is represented by the following Formula 6:

[Chemical Formula 6]

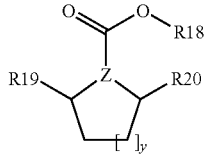

wherein, in the above formula 6, Z is N or P, R18 is selected from the group consisting of a substituted or unsubstituted alkyl, a substituted or unsubstituted aryl, a substituted or unsubstituted arylalkyl, and a substituted or unsubstituted cycloalkyl, R19 and R20 are respectively selected from the group consisting of hydrogen, a substituted or unsubstituted alkyl, a substituted or unsubstituted aryl, a substituted or unsubstituted aryl alkyl, and a substituted or unsubstituted cyclo alkyl, and y is an integer ranging from 0 to 5.

6. The composition of claim 1, comprising:
1 to 60 wt % of (A);
1 to 60 wt % of (B);
0.0001 to 0.1 wt % of (C); and
a balance of (D).

7. The composition of claim 1, further comprising a polymer selected from the group consisting of poly(meth)acrylate, a nylon, a polyester, a polyimide, a silicon polymer, and mixtures thereof.

8. The composition of claim 1, further comprising an additive selected from the group consisting of a catalyst for a heat-curing reaction, a surfactant, an antioxidant, an infrared stabilizer, a plasticizer, a leveling agent, a coupling agent, a filler, and mixtures thereof.

9. A color filter comprising a protective film prepared by curing the thermosetting resin composition of claim 1.

10. A liquid crystal display (LCD) comprising the color filter of claim 9.

11. An image sensor comprising the color filter of claim 9.

* * * * *